(12) United States Patent
Murgai

(10) Patent No.: US 8,923,490 B2
(45) Date of Patent: Dec. 30, 2014

(54) SYSTEMS AND METHODS FOR PROVIDING SEARCHABLE CUSTOMER CALL INDEXES

(71) Applicant: Nikhil Murgai, Providence, RI (US)

(72) Inventor: Nikhil Murgai, Providence, RI (US)

(73) Assignee: Capital One Financial Corporation, McLean, VA (US)

(*) Notice: Subject to any disclaimer, the term of this patent is extended or adjusted under 35 U.S.C. 154(b) by 0 days.

(21) Appl. No.: 14/062,240

(22) Filed: Oct. 24, 2013

(65) Prior Publication Data

US 2014/0169547 A1  Jun. 19, 2014

Related U.S. Application Data

(60) Provisional application No. 61/738,147, filed on Dec. 17, 2012.

(51) Int. Cl.
*H04M 1/64* (2006.01)
*H04M 3/51* (2006.01)

(52) U.S. Cl.
CPC .................................. *H04M 3/5175* (2013.01)
USPC ..................... 379/85; 379/88.02; 379/220.01; 379/265.09

(58) Field of Classification Search
USPC ........................ 379/85, 88.02, 220.01, 265.09
See application file for complete search history.

(56) References Cited

U.S. PATENT DOCUMENTS 8,005,829 B2* 8/2011 Nasukawa et al. ............ 707/730
8,615,074 B1* 12/2013 Rivier et al. ............. 379/265.06
2006/0171520 A1* 8/2006 Kliger ...................... 379/218.01

FOREIGN PATENT DOCUMENTS

JP            2002152367 A  *  5/2002

* cited by examiner

*Primary Examiner* — Quynh Nguyen
(74) *Attorney, Agent, or Firm* — Finnegan, Henderson, Farabow, Garrett & Dunner, LLP

(57) ABSTRACT

A system and method is provided for providing searchable customer call indexes. Consistent with disclosed embodiments, a system may receive call information associated with telephone conversations between callers and a vendor, the call information including an audio recording or transcript for each telephone conversation. The system may also identify one or more keywords from the audio recordings or transcripts and index the call information into one or more indexes based on the identified keywords. Finally, the system may determine search results responsive to a search query based on the indexing. In some embodiments, changes to customer service may be identified based on the search results.

20 Claims, 9 Drawing Sheets

SYSTEMS AND METHODS FOR PROVIDING SEARCHABLE CUSTOMER CALL INDEXES

CROSS REFERENCE TO RELATED APPLICATION

This application claims priority under 35 U.S.C. §119 to U.S. Provisional Application No. 61/738,147, filed on Dec. 17, 2013, which is expressly incorporated herein by reference in its entirety.

FIELD

The disclosed embodiments generally relate to creating searchable customer call indexes and, more particularly, creating searchable customer call indexes based on customer conversations.

BACKGROUND

Companies offering products and services also often provide customer services associated those offerings. Using these customer services, consumers can contact the company to learn more about a product or service, report problems with the product or service, or provide other feedback to the company. A company's customer service department typically includes a call center for receiving consumer calls and agents who answer those calls and interact with the consumers. The consumers' exchange with the company's agents is often recorded and saved for later use by the company. For example, the company may review past customer service calls to identify problems in its products or services. But in industries that regularly involve a significant amount of consumer interaction, such as the financial service industry, companies can find the task of manually reviewing a large number of received customer service calls difficult.

SUMMARY

Consistent with disclosed embodiments, systems and methods are provided for creating searchable customer call indexes. For example, disclosed embodiments may allow a financial service provider to identify common patterns in customer conversations for indexing purposes. In some embodiments, the financial service provider may receive transcribed telephone conversations between customers and telephone operating agents, and move the transcribed calls into searchable indexes. Each call may be placed into one or more indexes based on the content of the conversation. The financial service provider may then search the indexes and use the search results to determine patterns in calls between the customers and agents. Such patterns may reflect stress associated with specific aspects of the financial service provider (e.g., the financial service provider's website). Additionally, the financial service provider may identify the customer and agent associated with each call of the search result. The financial service provider may implement company changes based on the search results.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
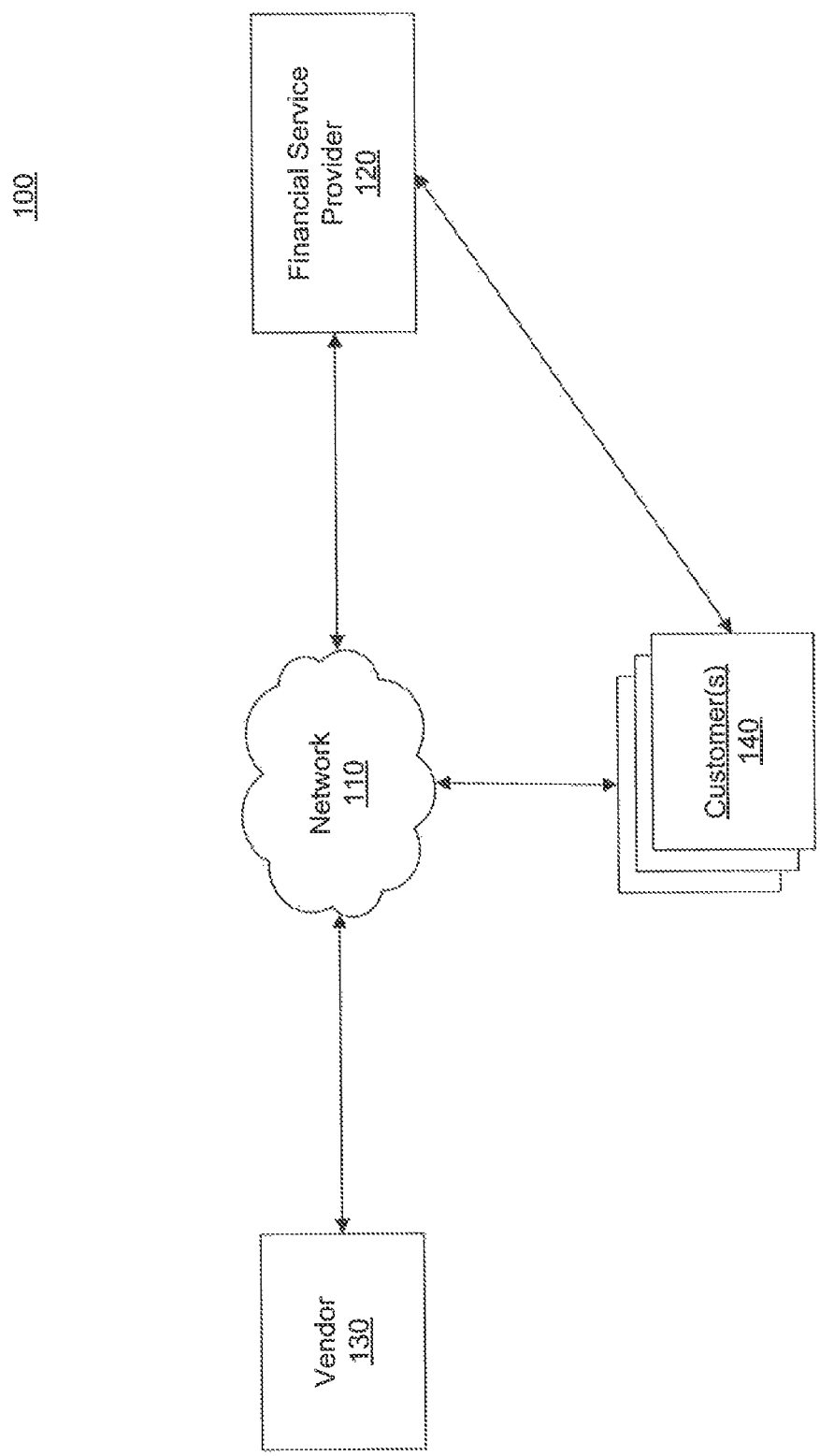
FIG. 1 illustrates an exemplary system for providing searchable customer call indexes, consistent with disclosed embodiments.

FIG. 1 is a diagram illustrating an exemplary system 100 for providing searchable customer call indexes. The components and arrangement of the components described in FIG. 1 may vary. For example, while some components of FIG. 1 are represented in a singular manner, in some embodiments, components may be combined, omitted, or duplicated. Furthermore, system 100 may additionally include other entities and/or sources of information that is associated with customer calls. As shown in FIG. 1, system 100 may include a network 110, financial service provider 120, vendor 130, and customer(s) 140.

Network 110 may be any type of network configured to provide communications between components of FIG. 1. For example, network 100 may be any type of network (including infrastructure) that provides communications, exchanges information, and/or facilitates the exchange of information, such as the Internet, a Local Area Network, or other suitable connection(s) that enables system 100 to send and receive information between the components of system 100.

Financial service provider 120 may provide a variety of financial services and/or products for customers. In one aspect, the financial service provider may provide and manage credit card accounts. In certain aspects, each credit card account may be associated with a customer's financial service account managed by financial service provider 120. Financial service accounts may further include, for example, checking accounts, savings accounts, loans, and investment accounts. In one embodiment, financial service provider 120 may include one or more computing systems that are located at a central location or may include computing devices that are distributed (locally or remotely). In one example, financial service provider 120 may include a server that is configured to execute software instructions stored in one or more memory devices to perform one or more operations consistent with the disclosed embodiments.

Vendor 130 may include any entity having infrastructure capable of receiving and collecting data. For example, vendor 130 may receive incoming telephone calls and store the call information in voice databases. Vendor 130 may include one or more physical locations (brick and mortar location) with call centers comprising one or more agents. The agents may be human or a computing system capable of answering an incoming call and interacting with customers. In other embodiments, vendor 130 may include one or more computing systems to provide and manage one or more websites or mobile applications capable of receiving the incoming calls. Vendor 130 may be associated with financial service provider 120 or may be a separate entity.

Customer(s) 140 may include one or more customers associated with financial service accounts of financial service provider 120. Additionally, or alternatively, customer 140 may include one or more consumers who are currently making and/or have previously made telephone calls directed to financial service provider 120, whether or not they have an account associated with financial service provider 120. Customer 140 may communicate with other components of system 100 using any suitable computer device and/or telephonic device.

Figure 2:
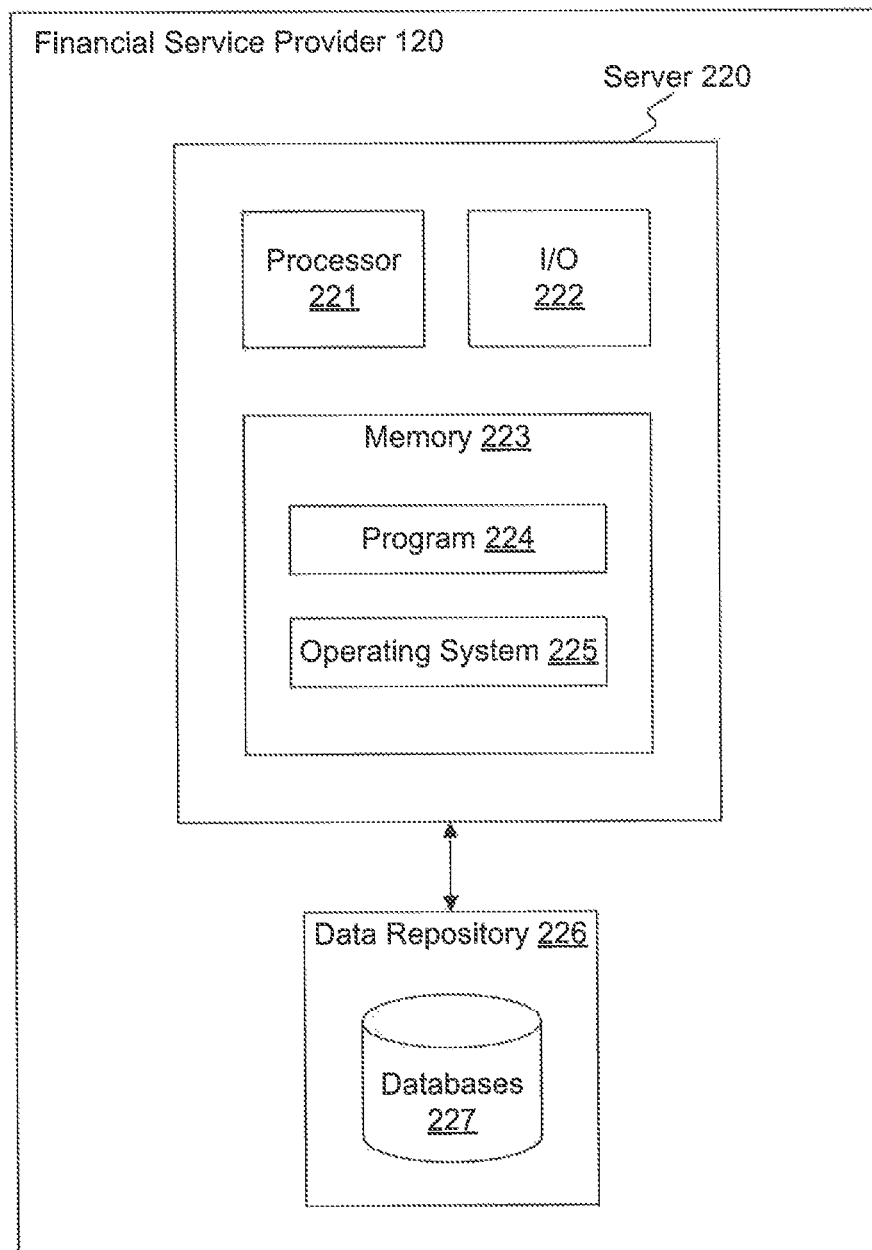
FIG. 2 illustrates another exemplary system for providing searchable customer call indexes, consistent with disclosed embodiments.

FIG. 2 shows an exemplary system that may be associated with a financial service provider and included in financial service provider 120. In one embodiment, the system includes a server 220 having one or more processors 221, one or more memories 223, and one or more input/output (I/O) devices 222. Alternatively, server 220 may take the form of a general purpose computer, a mainframe computer, or any combination of these components. Server 220 may be standalone, or it may be part of a subsystem, which may be part of a larger system.

Server 220 may also be communicatively connected to one or more data repositories 226, as shown in FIG. 2. Server 220 may be communicatively connected to data repositories 226 through network 110. Data repository 226 may include one or more files or databases 227 that store information and are accessed and/or managed through server 220. By way of example, databases 227 may be Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, financial service provider 120 may include data repository 226. Alternatively, data repository 226 may be located remotely from financial service provider 120.

Figure 3:
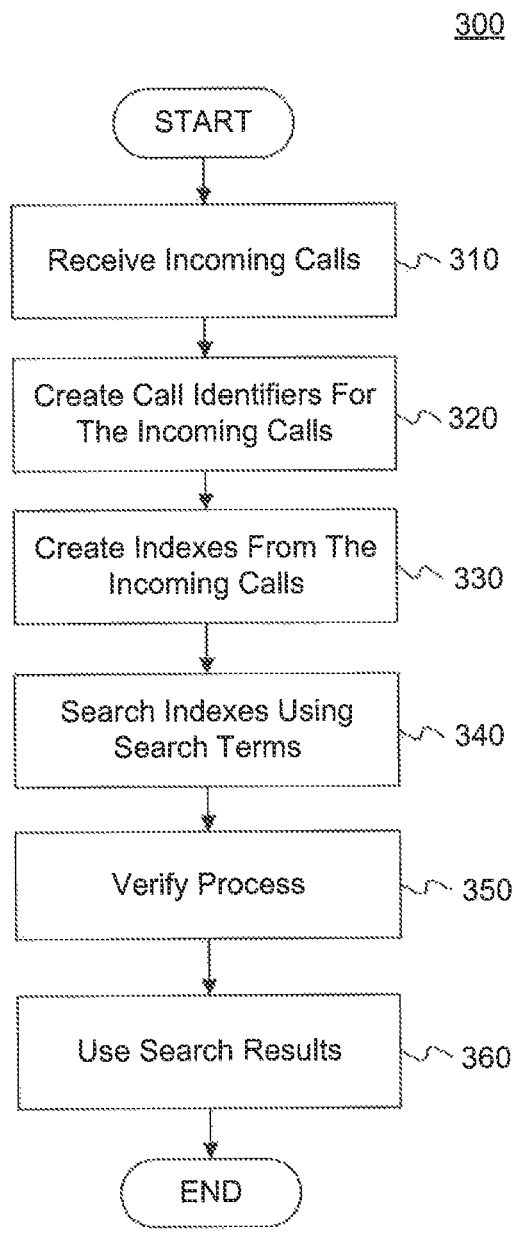
FIG. 3, depicts a flowchart of an exemplary method for providing searchable customer call indexes, consistent with disclosed embodiments.

FIG. 3 is a flow diagram 300 of an exemplary method for providing a searchable customer call index, consistent with disclosed embodiments. In step 310, financial service provider 120 may receive incoming calls. In some embodiments, financial service provider 120 may direct the calls to vendor 130 and receive call information (e.g., content of telephone conversation) from vendor 130. Server 220 may move the call information into a programmable database, such as database 227. A more detailed discussion is provided below regarding the receiving incoming calls (see FIG. 4).

Server 220 may also create call identifiers based on the incoming calls (step 320). As a non-limiting example, server 220 may receive call data (e.g., time/length of call, customer identification number, etc.) associated with the incoming calls and assign an identifier to each call. Furthermore, server 220 may associate the identifier to the call data of the incoming call. A more detailed discussion is provided below regarding the creation of call identifiers (see FIG. 5).

In some aspects, server 220 may create call indexes from the incoming calls (step 330) by determining the frequency of specific keywords/phrases and stress features in the incoming calls. Server 220 may determine if the frequencies meet a predetermine threshold and move the calls into call indexes based on the determination. A more detailed discussion is provided below regarding the creating call indexes from the incoming calls (see FIG. 5).

Server 220, in step 340, may search the call indexes using one or more search terms (step 340). In some embodiments, server 220 may move the call indexes into searchable databases and search the databases using search queries. Additionally, server 220 may associate the search results with the identifiers associated with an incoming call. A more detailed discussion is provided below regarding searching the indexes using search terms (see FIG. 7).

In some embodiments, server 220 may verify the call identifiers and/or call indexing by determining the accuracy of the identifiers and/or indexing for a percentage of the calls (step 350). In some embodiments, humans may conduct the verification and server 220 may analyze the results and design improvements to process 300. A more detailed discussion is provided below regarding verifying the call identifiers and/or call indexing (see FIG. 8).

Server 220 may additionally analyze the search results as shown in step 360. Specifically, server 220 may determine patterns in the search results and implement company changes based on these patterns. A more detailed discussion is provided below regarding using the search results (see FIG. 9).

Figure 4:
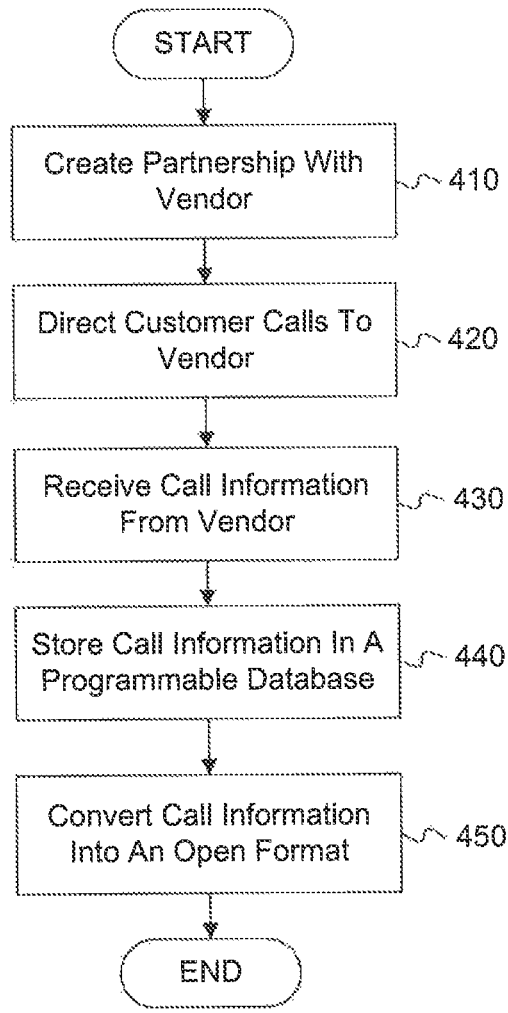
FIG. 4 depicts a flowchart of an exemplary method for receiving incoming calls, consistent with disclosed embodiments.

FIG. 4 depicts a flowchart of an exemplary method for receiving incoming calls from customers 140. In some embodiments, financial service provider 120 and vendor 130 may form separate entities, and financial service provider 120 may create a partnership with vendor 130 (step 410). For example, the two entities may agree to direct incoming customer calls from financial service provider 120 to vendor 130 (step 420). Therefore, a customer 140 attempting to call financial service provider 120 may have the call directed to vendor 130. In other embodiments, financial service provider 120 and vendor 130 may comprise the same entity. In some embodiments, server 220 may receive the incoming calls.

Server 220 may receive call information from vendor 130, as shown in step 430. Such call information may include the transcribed content of telephone conversations between vendor 130 and customers 140 associated with financial service provider. For example, the call information may include a transcript of a call between an agent associated with vendor 130 and customer 140 regarding customer accounts associated with financial service provider 120. Server 220 may receive the call information from databases associated with vendor 130.

In some aspects, server 220 may store the call information in a programmable database, such as database 227 (step 440). Such a programmable database may provide for the storing of large amounts of information and subsequent searching and retrieving of the information stored within the database. Server 220 may additionally convert the call information from a proprietary to an open format, as shown in step 450. Conversion to an open format may allow server 220, or another entity, to execute software to access, manipulate, and/or analyze the call information without use of a particular proprietary computer program. Financial service provider 120 may create a partnership with a converting entity, wherein the converting entity may convert call information received in a proprietary format into the open format. Alternatively, financial service provider 120 may convert the call information to the open format.

Figure 5:
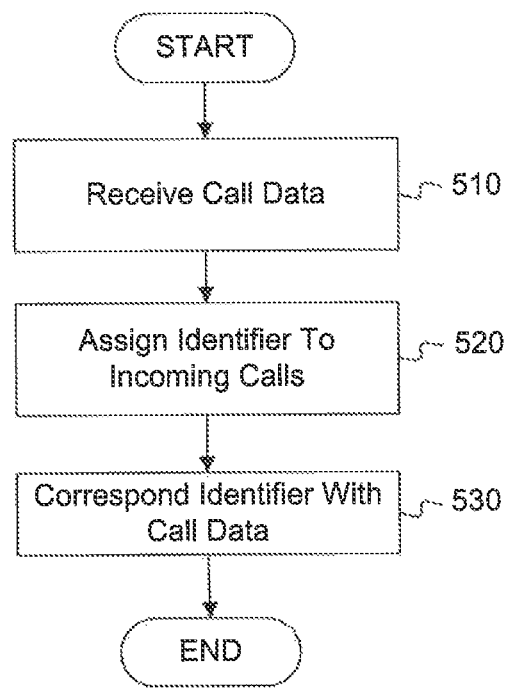
FIG. 5 depicts a flowchart of an exemplary method for creating call identifiers for incoming calls, consistent with disclosed embodiments.

FIG. 5 depicts a flowchart of an exemplary method for creating call identifiers for incoming calls, consistent with disclosed embodiments. Server 220 may receive call data from vendor 130 (step 510), wherein the call data may include the date, time, and/or length of the telephone call between customer 140 and an agent of vendor 130, a customer identification number, a call center identification number, an agent identification number, and the like. The customer identification number may be unique to each customer 140 associated with financial service provider 120 and may include an account number, telephone number, customer social security number, and/or any other identifier, including any combination of this data. In other embodiments, the customer identification number may refer to groups of customers. The call center identification number may include the vendor location from which the customer calls are answered. For example, the call center identification number may include an identifying number representing the city or town in which the agents employed by vendor 130 answered the incoming telephone calls. An agent identification number may include an employment number and/or any other identifier capable of representing the agent associated with vendor 130 that answered the incoming call.

As shown in step 520, server 220 may assign an identifier to the incoming calls. The identifier may represent numbers, letters, characters, and/or any combination of such. Each incoming call may receive an identifier that is substantially unique from other incoming calls. In some embodiments, server 220 may additionally associate the identifier with the call data of the incoming call (step 530). In other embodiments, server 220 may generate the call identifier based on the call data. Regardless, each identifier may represent a particular set of call data associated with a specific call made to financial service provider 120.

Figure 6:
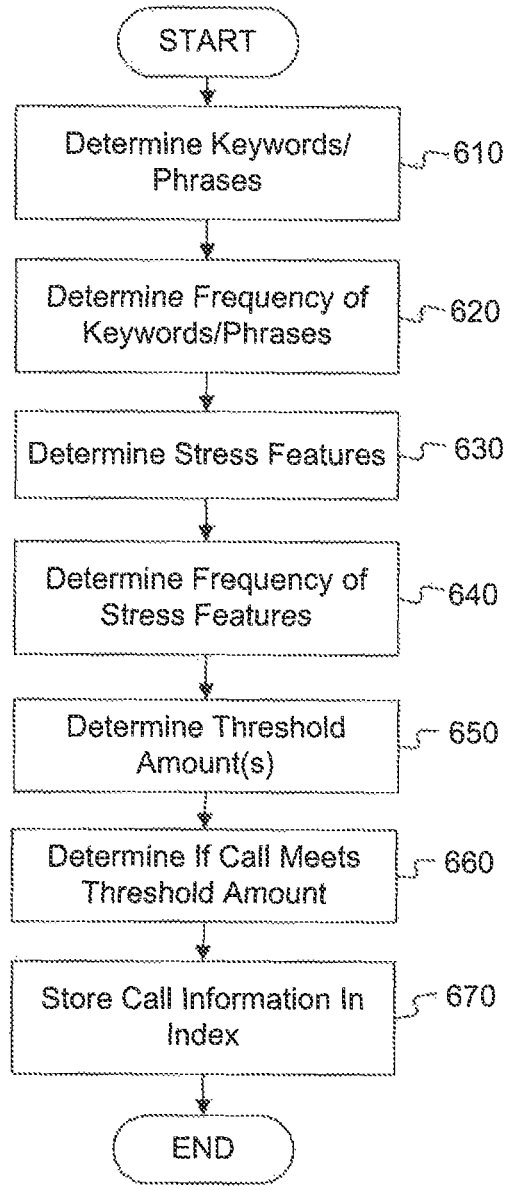
FIG. 6 depicts a flowchart of an exemplary method for creating call indexes from incoming calls, consistent with disclosed embodiments.

FIG. 6 depicts a flowchart of an exemplary method for creating call indexes from incoming calls consistent with disclosed embodiments. In some embodiments, server 220 may determine one or more algorithms and processes to store and organize the call information and call data. For example, server 220 may determine one or more keywords and/or phrases by which the incoming calls may be organized into various indexes (step 610). Server 220 may use keywords/phrases associated with customer service, compliance, or any other business aspect of financial service provider 120. For example, in some embodiments, server 220 may use such keywords as "fraud", "bankrupt", "website", "debit card", etc. to identify an index/indexes to assign the call data. In other embodiments, server 220 may use such phrases as "I can't find", "I'm not happy", "it's not working", "fraudulent transaction", etc. to identify an index/indexes to assign the call data.

As shown in step 620, server may determine the frequency of the keywords/phrases in the call information for each incoming call. In some embodiments, if the frequency passes a predetermined threshold, server 220 may move the call into an index with other incoming calls that have also met this predetermined threshold.

Additionally or alternatively, server 220 may determine stress features by which the incoming calls may be organized (step 630). For example, stress features may include a determination that the customer 140 talked louder, faster, and/or changed the pitch of certain syllables during a call. The stress features may be based on a spectrogram, i.e., voice print, associated with an audio recording of a call between an agent associated with vendor 130 and customer 140. Server 220 may compare the incoming call to a baseline rating to determine if the stress features are present. The baseline rating may be predefined or determined based on the average stress rating of all received call information within the past twelve months, etc. Additionally or alternatively, the baseline rating may be predefined or determined based on the stress rating present at the beginning of a call (e.g., first 5-10 seconds). In some embodiments, server 220 may compare at least a portion of the remainder of the call to the beginning of the call to determine if stress features are present. For example, server 220 may compare the volume of a portion of a customer call with the volume present during the first 5-10 seconds to determine that stress features are present based on, for example, an increase in the volume as compared to the first 5-10 seconds of the call. In some embodiments, server 220 may compare the talking speed of customer 140 within 6 minutes into the call compared to the talking speed of customer 140 during the first 5-10 seconds of the call to determine stress features. As shown in step 640, server may determine the frequency of the stress features in the call information for each incoming call. In some embodiments, server 220 may determine the stress level for a subgroup of incoming calls. For example, server 220 may determine the stress level for calls determined to include (or do not include) the phrase "I'm not happy."

Server 220 may determine one or more threshold amounts for the frequency of keywords, phrases, and/or stress features in the call information. (step 650) The threshold amount(s) may be specific to a certain element or to a combination of elements. For example, the threshold amount may represent wherein the keyword, phrase, or stress feature is used ten or more times during the conversation between customer 140 and the agent associated with vendor 130. Alternatively, server 220 may require the threshold amount to represent conversations where the keyword, phrase, or stress feature reflects 20% of the words used during the conversation. In other embodiments, the threshold amount may comprise a number associated with a combination of keywords, phrases, and stress features present in the conversation. In one example, the threshold amount may be met if 50% of the words used during the conversation include words from a predetermined list, such as a list including "I can't find," "website," "show me," etc. In another example, server 220 may require for 50% of the words used during the conversation include words from the predetermined list and one or more stress features to be present, for example, a raised voice lasting at least 30 seconds in length. In another example, server 220 may assign weighted values to one or more phrases and consider the weighted values in determining whether the threshold value has been met.

In step 660, server 220 may compare the incoming call information with the threshold amount and determine if the call meets the threshold amount. Server 220 may store the call information in an index associated with the threshold amount if the call meets the threshold amount (step 670). Therefore, all calls in that specific index meet the threshold amount. In some aspects, a single call may meet more than one threshold amounts providing for that single incoming call placed into multiple indexes.

In some embodiments, server 220 may create a first index associated with the customer 140 and a second index associated with the agent of vendor 130. This may allow server 220 to distinguish between keywords, phrases, and stress features of the customer 140 and keywords, phrases, and stress features of the agent. For example, server 220 or vendor 130 may separate the call information (e.g., content of telephone conversation) into words spoken by the customer 140 and words spoken by the agent. Server 220 may then search for keywords, phrases, and stress features in both the customer data and the agent data and move each into indexes designated for customers or agents, respectively.

Figure 7:
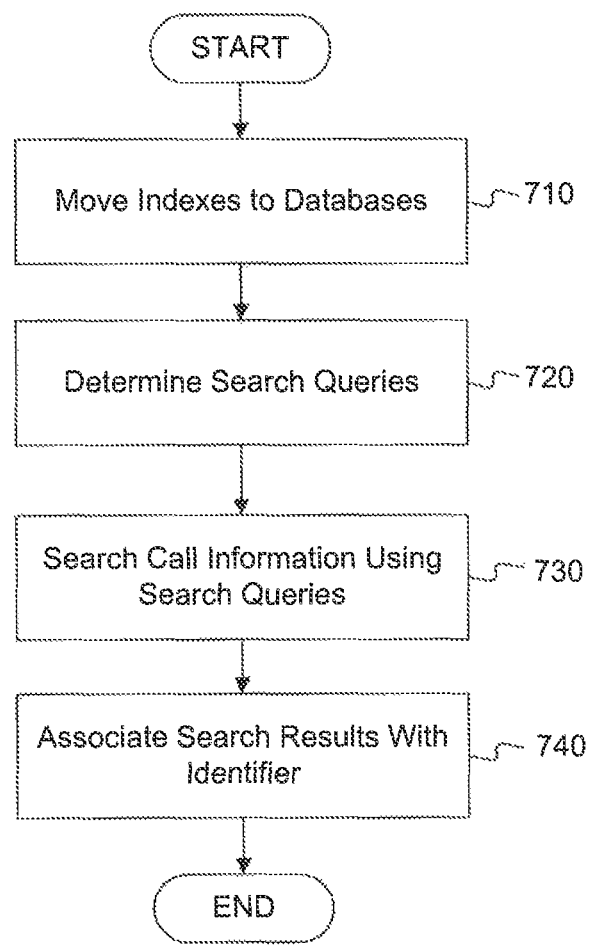
FIG. 7 depicts a flowchart of an exemplary method for searching call indexes using search terms, consistent with disclosed embodiments.

FIG. 7 depicts a flowchart of an exemplary method for searching the indexes using search terms, consistent with disclosed embodiments. Server 220, as shown in step 710, may store the indexes in searchable databases (e.g., Teradata or the like). Server 220 may additionally determine one or more search queries by which to search the indexes (step 720). For example, server 220 may search for conversations where "website" and "confusing" were both used at least 5 times during the conversation. Alternatively, server 220 may search for particular levels of stress features present when a customer used the word "credit card" at least 20 times during the conversation. In other embodiments, other words may be considered indicative of stress features. For example, server 220 may search for calls that contain "complaint" and either one or more of "FBI", "fed", "Consumer Financial Protection Bureau (CFPB)", "Better Business Bureau," etc. to detect stress features. It is further contemplated that server 220 may, in one embodiment, search for occurrences of "manager," "supervisor," or "CEO" and one or more stress features in a customer call.

Server 220 may search the call information based on the one or more indexes using the search query to identify a subset of the received call information (step 730). The subset may include incoming calls that meet provided search criteria. Server 220 may search only designated indexes or all indexes. Furthermore, server 220 may associate the search results with the identifier unique to each incoming call (step 740). Therefore, if twenty conversations meet the search criteria, server 220 may identify the identifier for each conversation. Such identifiers may be associated with the call data (e.g., time and length of the call, customer identification number, call center identification number, etc.). Thus, server 220 may locate the customers, agents, and vendor location associated with each of the twenty conversations meeting the search results.

Figure 8:
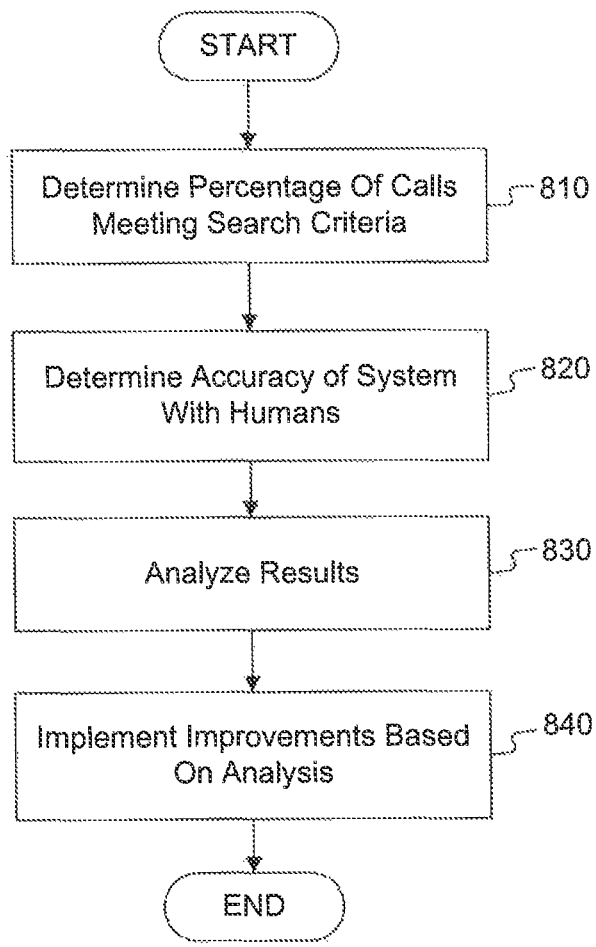
FIG. 8 depicts a flowchart of another exemplary method for verifying the searchable customer call indexes, consistent with disclosed embodiments.

FIG. 8 depicts a flowchart of an exemplary method for verifying the call identifiers and/or call indexes, consistent with disclosed embodiments. In step 810, server 220 may determine the percentage of calls falling within the search results. In some embodiments, if twenty calls meet a set of search criteria and financial service provider 120 received 10,000 calls during the applicable period, server 220 may determine that 0.2% of calls meet the search criteria. Server 220 may further determine the accuracy of the determined statistic (and, thus, the system's accuracy in determining the call identifiers and/or call indexes) based on human review of a subset of the 10,000 calls received during the applicable period (step 820). For example, humans may read the transcribed calls for all or a subset of the 10,000 calls to determine a percentage of calls meeting the same search criteria. Server 220 may compare the percentage of calls determined from server 220 and the percentage determined from humans and analyze the results (step 830). Server 220 may use the analysis to implement improvements within the process. For example, if server 220 determined that humans detected 0.4% of calls met the search criteria, as opposed to the 0.2% identified by server 220 in the above example, server 220 may determine that server 220 is not adequately recognizing certain words, accents, pitch syllables, etc. Server 220 may implements changes to improve upon such, thereby making server 220 more sensitive to various pronunciations (step 840). For example, server 220 may detect from the analysis that it is only detecting one out of multiple pronunciations of a particular word. Server 220 may then add the various other pronunciations to the algorithm that determines the frequency of the keywords in the call information.

Figure 9:
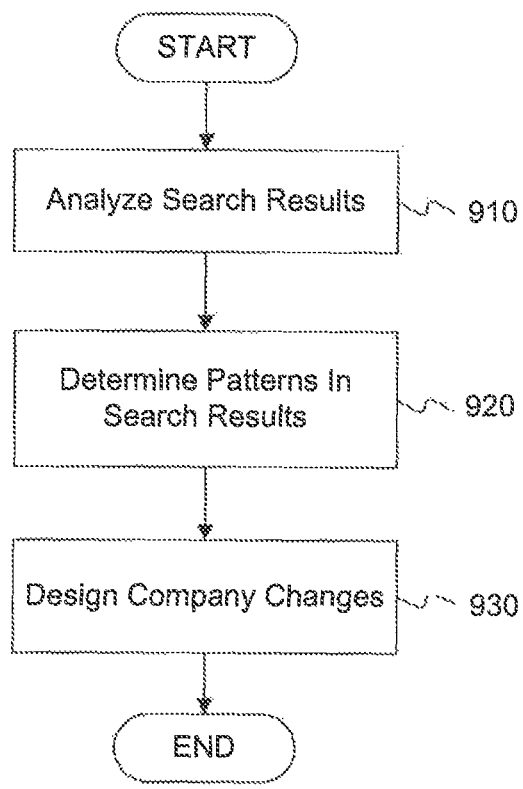
FIG. 9 depicts a flowchart of an exemplary method for using search results obtained from search call indexes, consistent with disclosed embodiments.

FIG. 9 depicts a flowchart of an exemplary method for using the search results, consistent with disclosed embodiments. Server 220 may analyze the search results (step 910) and determine common patterns (step 920). For example, server 220 may determine that 30% of customers do not know how to find an item on a website associated with financial service provider 120. In another example, server 220 may determine that 50% of customers, when they have encountered fraudulent transactions on their account, show signs of becoming frustrated (e.g., raise voice, talk faster, etc.). Additionally, server 220 may identify conversations where an agent associated with vendor 130 acted inappropriately toward customer 140. In another embodiment, server 220 may determine that 90% of the agents associated with a specific call center (e.g., vendor location from which the customer calls are answered) are not familiar with how to process bankrupt filings. Based on the determinate common patterns, server 220 may design company changes based on these results, as shown in step 930, including but not limited to changes to the website, training agents how to interact with agitated customers, training agents on specific matters such as bankruptcy, etc. Additionally, server 220 may contact the customer 140 and/or agent directly, using the identifier and call data, involved in a telephone conversation meeting the search criteria. This may allow server 220 to facilitate company changes by addressing the problem directly with the customer 140 and/or agent directly.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

What is claimed is:

1. A system for providing searchable call indexes, comprising:
   one or more processors; and
   one or more memory devices storing instructions that, when executed by the one or more processors, perform operations comprising:
   receiving call information associated with each of a plurality of telephone conversations between callers and at least one vendor, the call information including at least one of an audio recording and a transcript associated with each telephone conversation;
   identifying one or more keywords from the call information associated with each telephone conversation;
   determining a frequency of the one or more keywords in the call information;
   indexing the call information associated with each telephone conversation into one or more indexes based on the identified one or more keywords and the frequency of the one or more keywords;
   receiving improvement data indicating one or more errors comprising a failure to identify one or more keywords in the audio recording, wherein the improvement data further comprises additional pronunciations of the one or more keywords;
   identifying one or more additional keywords based on the additional pronunciations; and determining search results from the one or more indexes responsive to a search query based on the one or more keywords and one or more additional keywords.

2. The system of claim 1, wherein the call information further includes a voiceprint of the telephone conversation, and wherein the one or more processors is configured to index the call information by indexing the call information based on the one or more keywords, the frequency of the one or more keywords, and at least one stress feature identified in the voiceprint.

3. The system of claim 2, wherein the at least one stress feature is identified by determining that the caller talked louder, the caller spoke faster, or the caller's voice changed pitch compared to an earlier portion of the telephone conversation.

4. The system of claim 1, wherein the call information further includes one or more call characteristics comprising one or more of a date of the telephone conversation, a time the telephone conversation occurred, a length of the telephone conversation, a customer identifier, a call center identifier, and a vendor agent identifier.

5. The system of claim 4, wherein the stored instructions configure the one or more processors to perform further operations comprising:
receiving a selection of at least one of the call characteristics; and
updating the search results based on the received selection to narrow the search results according to the selected at least one of the call characteristics.

6. The system of claim 2, wherein the stored instructions configure the one or more processors to perform further operations comprising:
assigning a weight to each of a plurality of keywords and stress features;
weighting the one or more identified keywords and stress features based on the assigned weights; and
indexing the call information based on the weighted keywords and stress features.

7. The system of claim 2, wherein the stored instructions configure the one or more processors to perform further operations comprising determining the at least one stress feature for only telephone conversations having a frequency of identified keywords above a predetermined threshold.

8. The system of claim 1, wherein the stored instructions configure the one or more processors to perform further operations comprising:
receiving the call information in a proprietary format;
converting the call information into an open format; and
storing the converted call information into a database for indexing.

9. A method for providing searchable call indexes, comprising:
receiving call information associated with each of a plurality of telephone conversations between callers and at least one vendor, the call information including at least one of an audio recording or a transcript and voiceprint associated with each telephone conversation;
identifying, via one or more processors, one or more keywords and stress features from the call information associated with each telephone conversation;
determining, via the one or more processors, a frequency of the one or more keywords in the call information;
indexing, via the one or more processors, the call information associated with each telephone conversation into one or more indexes based on the identified one or more keywords, the identified one or more stress features, and the frequency of the one or more keywords;
receiving improvement data indicating one or more indexing errors and one or more errors comprising a failure to identify one or more keywords in the call information, wherein the improvement data further comprises additional pronunciations of the one or more keywords or one or more additional stress features;
identifying a second set of one or more keywords and stress features based at least on the improvement data;
determining, via the one or more processors, an updated frequency of the one or more keywords in the call information based on the identified second set of one or more keywords and stress features; and
re-indexing, via the one or more processors, the call information associated with each telephone conversation into the one or more indexes based on the second set of identified one or more keywords and stress features and the updated frequency of the one or more keywords.

10. The method of claim 9, wherein the at least one stress feature is identified by determining that the caller talked louder, the caller spoke faster, or the caller's voice changed pitch compared to an earlier portion of the telephone conversation.

11. The method of claim 9, wherein the call information further includes one or more call characteristics comprising one or more of a date of the telephone conversation, a time the telephone conversion occurred, a length of the telephone conversation, a customer identifier, a call center identifier, and a vendor agent identifier.

12. The method of claim 11, further comprising:
receiving a selection of at least one of the call characteristics; and
updating the search results based on the received selection to narrow the search results according to the selected at least one of the call characteristics.

13. The method of claim 9, further comprising:
assigning a weight to each of a plurality of keywords and stress features;
weighting the one or more identified keywords and stress features based on the assigned weights; and indexing the call information based on the weighted keywords and stress features.

14. The method of claim 9, wherein the stress features are determined for only telephone conversations having a frequency of identified keywords above a predetermined threshold.

15. The method of claim 9, further comprising:
receiving the call information in a proprietary format;
converting the call information into an open format; and
storing the converted call information into a database for indexing.

16. The method of claim 9, further comprising:
determining search results from the one or more indexes responsive to a search query based at least one of the second set of set of identified one or more keywords and stress features.

17. A system for providing searchable call indexes, comprising:
one or more processors; and
one or more memory devices storing instructions that, when executed by the one or more processors, perform operations comprising:
identifying a first set of one or more keywords and stress features for each of a plurality of telephone conversations associated with in an audio recording between a customers and at least one vendor;

determining a frequency of the first set of one or more keywords for each of the plurality of telephone conversations;

indexing call data associated with each telephone conversation into one or more indexes based on the first set of identified one or more keywords stress features and on the frequency of the first set of one or more keywords;

receiving improvement data indicating additional pronunciations of the one or more keywords, one or more indexing errors, and one or more errors in the identified first set of one or more keywords and stress features, wherein the one or more errors comprise a failure to identify one or more keywords in the audio recording;

identifying a second set of one or more keywords and stress features based on the improvement data and audio recordings;

determining a frequency of the second set of one or more keywords for each of the plurality of telephone conversations; and indexing the call data into the one or more indexes based on the second set of identified one or more keywords and stress features and the frequency of the second set of one or more keywords.

18. The system of claim 17, wherein the improvement data comprises at least one additional keyword or stress feature, and wherein the one or more processors is configured to identify the second set of one or more keywords and stress features based on the at least one additional keyword or stress feature.

19. The system of claim 17, wherein the stored instructions configure the one or more processors to perform further operations comprising:

determining search results from the one or more indexes responsive to a search query based at least one of the first set of identified one or more keywords and stress features and the second set of identified one or more keywords and stress features.

20. The system of claim 19, wherein the stored instructions configure the one or more processors to perform further operations comprising:

receiving a selection of at least one call characteristic; and updating the search results based on the received selection to narrow the search results according to the selected at least one of the call characteristics.

* * * * *